United States Patent [19]

Quazi et al.

[11] Patent Number: 4,864,482
[45] Date of Patent: Sep. 5, 1989

[54] CONVERSION CIRCUIT FOR LIMITING INRUSH CURRENT

[75] Inventors: Fazle S. Quazi; Ira S. Faberman, both of Boulder, Colo.

[73] Assignee: Etta Industries, Inc., Boulder, Colo.

[21] Appl. No.: 216,198

[22] Filed: Jul. 7, 1988

[51] Int. Cl.⁴ .............................................. H02M 5/44
[52] U.S. Cl. ...................................... 363/37; 363/15; 363/26
[58] Field of Search ...................... 323/222, 266, 908; 363/15, 16, 17, 24, 25, 26, 37

[56] References Cited

U.S. PATENT DOCUMENTS

| | | | |
|---|---|---|---|
| 3,569,817 | 3/1971 | Boehringer | 323/222 |
| 3,736,496 | 5/1973 | Lachocki | 323/222 |
| 3,913,000 | 10/1975 | Cardwell | 323/222 |
| 4,160,288 | 7/1979 | Stuart et al. | 363/26 |
| 4,245,285 | 1/1981 | Weiss | 363/17 |
| 4,510,400 | 4/1985 | Kiteley | 323/222 |
| 4,533,986 | 8/1985 | Jones | 323/266 |
| 4,620,271 | 10/1986 | Musil | 323/222 |
| 4,742,535 | 5/1988 | Hino et al. | 363/25 |
| 4,743,835 | 5/1988 | Bosse et al. | 323/266 |

Primary Examiner—Patrick R. Salce
Assistant Examiner—Jeffrey Sterrett
Attorney, Agent, or Firm—Gerald J. Ferguson, Jr.

[57] ABSTRACT

A conversion circuit is provided which includes a negative temperature coefficient resistance between a rectifier and a storage capacitor to limit inrush current when power is applied to the circuit after a power interruption of a relatively long duration. When power is resumed after a short term power interruption and the resistance of the negative temperature coefficient resistance is still low, inrush current is limited by disconnecting a load from the conversion circuit immediately upon the occurrence of the power interruption to maintain the charge on the storage capacitor for the duration of the interruption. A boost regulator unit is provied between the negative temperature coefficient resistance and the storage capacitor to provide a regulated direct current potential across the capacitor which is not responsive to input power variations.

16 Claims, 4 Drawing Sheets

CONVERSION CIRCUIT FOR LIMITING INRUSH CURRENT

TECHNICAL FIELD

The present invention relates generally to a conversion circuit for converting ordinary power line alternating current (AC) into direct current (DC) and then back to AC. More specifically, the conversion circuit operates to limit inrush current when circuit operation is initiated.

BACKGROUND OF THE INVENTION

For any electrical applications, it is necessary to convert power line AC into DC and then to convert this DC back into AC. Examples are switching power inverters, electronic ballasts, etc.

Common circuits for converting the power line AC into DC are half wave rectifier circuits and full wave rectifier circuits, and normally, the rectified voltage and current output from these rectifier circuits consists of a series of unidirectional waves or ripples. For some applications, these variations are not objectionable, but for others they must be smoothed out by filters.

Rectifiers without output filters find limited application owing to their high ripple output and relatively low conversion efficiency. Since the ultimate purpose of rectification is to produce a steady output voltage or current, the pulsating current from a rectifier must be smoothed, and the most common method of smoothing the rectifier output ripples is to use a large storage capacitor which is connected across the rectifier output. However, this storage or filter capacitor creates a potential problem; namely, a high inrush current. Due to the high storage capacity of the filter capacitor and its low equivalent series resistance, the filter capacitor behaves like a nearly perfect short circuit when the power supply first turns on. The resulting short-duration peak inrush current can reach levels much greater than the tolerable single-cycle ratings of conventional semiconductor rectifiers and therefore, inrush current often destroys rectifiers and other electronic components. Such inrush current also generates undesirable current surges in the input power line.

A well-known approach to limit the inrush current in a conversion circuit is by connecting a series resistor between the output of the rectifier and the filter capacitor. This is simple and reliable but not efficient. At any current level, the series resistor dissipates power that would otherwise be available to the load.

Another common method of limiting the inrush current is to use a negative temperature coefficient resistance, such as a thermistor, in place of the series resistor. At turn-on, the "several ohms" resistance in the thermistor limits the inrush current which, in turn, produces power in the termistor. The power in the termistor raises its temperature, and as a result, the resistance of the thermistor drops to a low value for normal operation. This is a very simple, economical and effective way to limit the inrush current. However, the use of a negative temperature coefficient thermistor for inrush current limiting can be very ineffective in some situations. A power converter may be operating at full load where the thermistor is very low in resistance, and a power interruption could occur which is long enough to cause the discharge of the filter capacitor, but too short for the thermistor to return to a high resistance state. Under this circumstance, when the AC voltage returns, a high inrush current will occur. This is true because the thermal time constant of a negative temperature coefficient thermistor is usually long and, as a result, a short term power interruption may not allow enough time for the thermistor resistance to sufficiently increase.

DISCLOSURE OF THE INVENTION

From the foregoing, it will be appreciated that there is a need to provide an electrical conversion circuit which is capable of limiting inrush current from a power line or other power supply under all operating conditions. Therefore it is a primary object of the present invention to provide a conversion circuit capable of so limiting inrush current.

Another object of the present invention is to provide a novel and improved conversion circuit which provides a constant, regulated DC voltage to the input of a high frequency switching inverter, such voltage being independent of AC line variations at the input to the conversion circuit.

Yet another object of the present invention is to provide a novel and improved conversion unit which includes a negative temperature coefficient resistance and a filter capacitor connected across a rectifier unit. The device includes a boost switching regulator to provide an output voltage to the filter capacitor which is greater than the input voltage received by the boost switching regulator from the negative temperature coefficient resistance. The boost switching regulator maintains a constant output voltage regardless of input voltage variations.

A further object of the present invention is to provide a novel and improved conversion unit which includes a storage capacitor to provide a DC voltage to a high speed switching inverter which in turn provides AC power to a load. In the event of power loss, the switching inverter immediately disconnects the load from the storage capacitor to maintain the charge on the filter capacitor for the duration of a short term power interruption.

A still further object of the present invention is to provide a novel and improved conversion unit for providing a converted, regulated signal to a load which operates immediately upon the occurrence of a power failure to isolate the load from the remainder of the circuit. The conversion unit includes a switching inverter to provide an AC potential to a load, and this potential is maintained constant without requiring a separate feedback network.

BEST MODE FOE CARRYING OUT THE INVENTION

Figure 1:
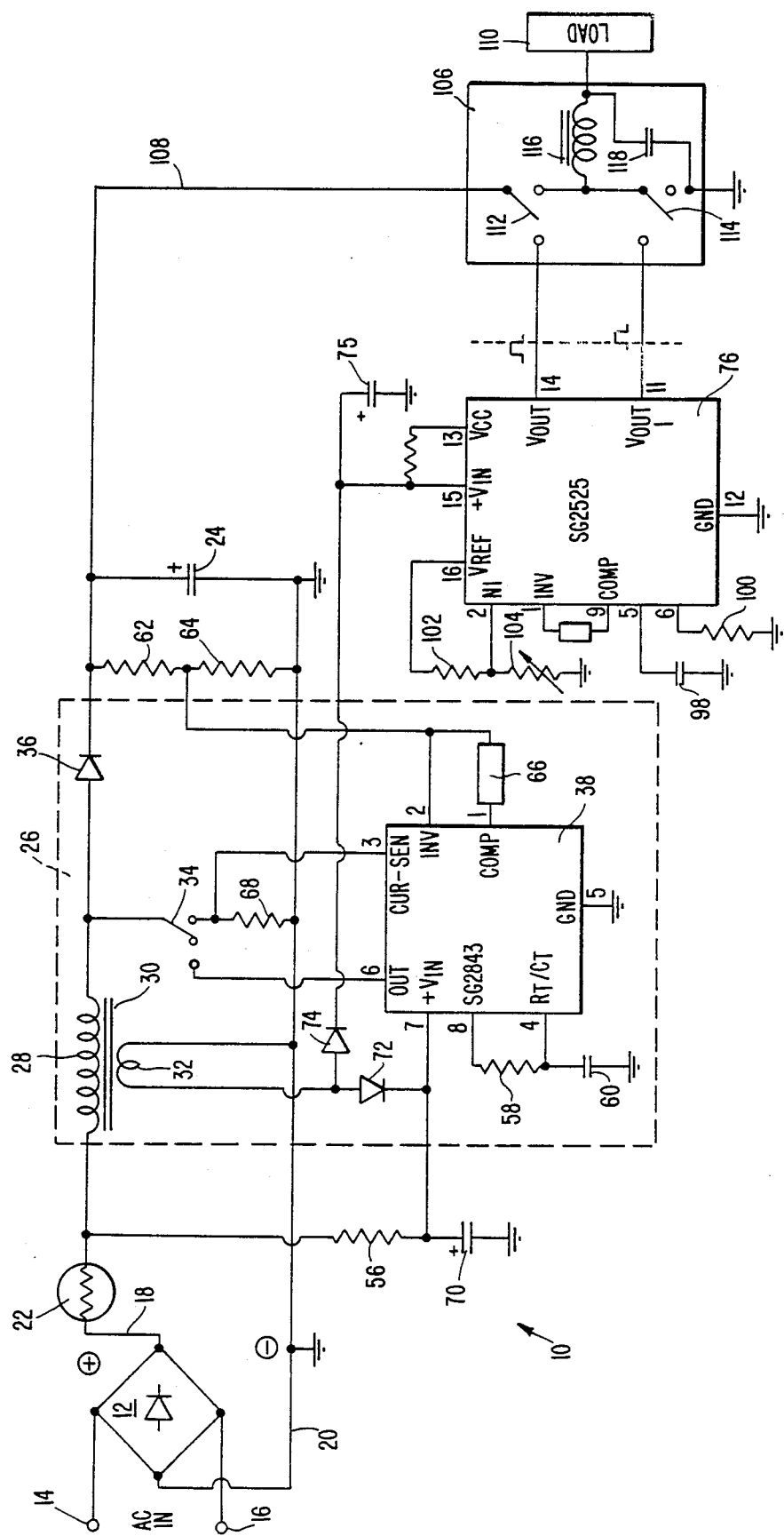
FIG. 1 is a circuit diagram of the conversion circuit of the present invention.

The basic conversion circuit of the present invention indicated generally at 10 in FIG. 1 includes a full wave bridge rectifier 12 having inputs 14 and 16 connected to an AC power line. The rectifier includes outputs 18 and 20 with a negative temperature coefficient thermistor 22 connected in series with the output 18. A storage capacitor 24 is connected to the outputs 18 and 20 of the bridge rectifier 12 via an inductor 28 and a rectifier 36.

The conversion circuit 10 is designed to effectively limit inrush current under all circuit operating conditions, even during a short power interruption. This is accomplished in part by a boost switching regulator 26 which includes an inductor 28 connected in series with the thermistor 22. This inductor serves the dual purpose of providing the primary winding for a transformer 30 having a secondary winding 32, and also of storing energy during the time that a switch 34 is turned on. Switch 34 if formed by any suitable semiconductor or mechanical switch which can be selectively rendered conductive by a control signal to complete a circuit. When the switch 34 is turned off, energy stored in the inductor 28 is transferred to the storage capacitor 24 through a series diode 36 connected therebetween. The output voltage from the boost switching regulator 26 is greater than the input voltage thereto.

Figure 2:
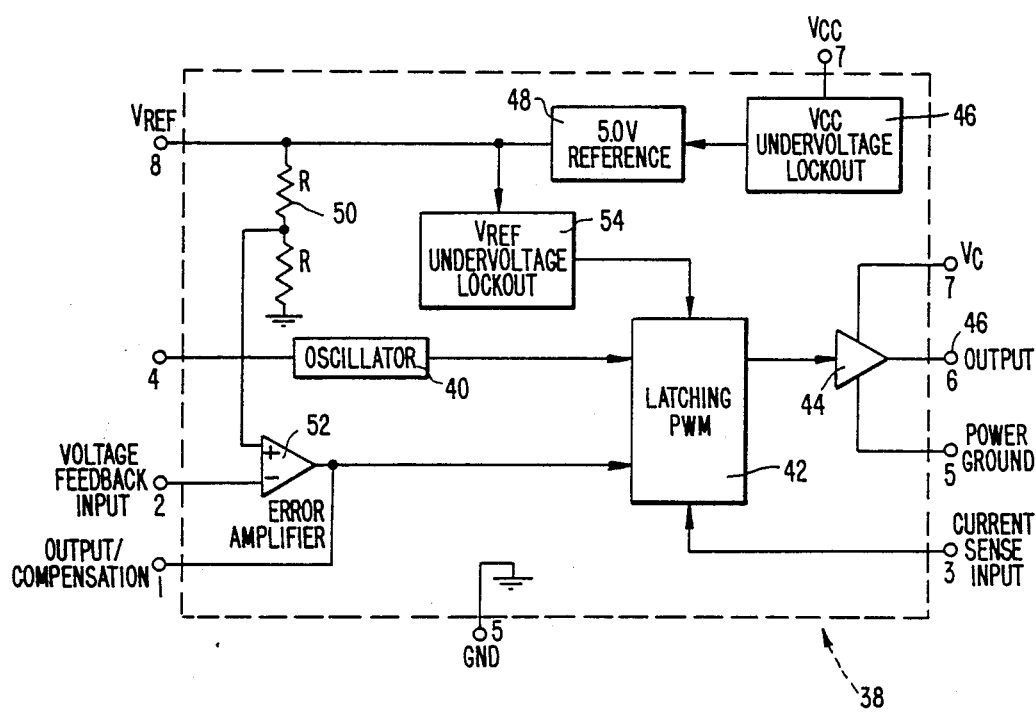
FIG. 2 is a block diagram of a pulse width modulator controller for the conversion circuit of FIG. 1.

The boost switching regulator 26 also includes a pulse width modulator controller 38 to drive the switch 34. This pulse width modulator controller is a conventional integrated circuit, such as a SG 2843 manufactured by Motorola, U.S.A. A basic block diagram of an eight pin pulse width modulator controller is shown in FIG. 2.

The pulse width modulator controller 38 includes an oscillator 40 which provides pulses to a latching pulse width modulator 42. The input signal on pin 4 sets the frequency of the oscillator and determines the pulse output frequency from the latching pulse width modulator through comparator 44 to an output pin 6. A current sense input for the latching pulse width modulator is provided by pin 3.

A low voltage supply is applied to pin 7 in order to provide power to the integrated circuit. Pin 7 is also connected internally to an undervoltage lockout circuit 46 and a 5 V reference circuit 48. This 5 V reference circuit 48 is connected to pin 8 and also provides a 2.5 V reference by means of an internal resistive voltage divider 50 to the non-inverting input of an error amplifier 52. The remaining inverted input for the error amplifier is connected to pin 2, while an output compensation terminal for the error amplifier is provided by pin 1. The reference voltage is also provided by means of an undervoltage lockout circuit 54 to the latching pulse width modulator 42.

Returning now to FIG. 1, the start-up current for the pulse width modulator controller 38 is provided by a resistor 56 connected to the output side of the thermistor 22. The pulse width modulator controller requires only a 1 milliampere start-up current, and this is provided to pin 7 by the resistor 56. The start-up current must be low so that power dissipation in the resistor 56 is insignificant.

With start-up power being provided to the pulse width modulator controller, the output frequency of the oscillator 40 is set by the series combination of a timing resistor 58 and a timing capacitor 60. This in turn determines the pulse output frequency on pin 6 which drives the switch 34. The magnitude of the output voltage across the storage capacitor 24 is set by sensing the voltage ratio between the resistors 62 and 64 connected in series across the capacitor 24 at the output side of the diode 36. An impedance 66 is often necessary for the loop stability of the latching pulse width modulator 42 and is connected between the compensation and the non-inverted terminals of the error amplifier 52 (pins 1 and 2). The signal from a current sense resistor 68 connected in series with the switch 34 is provided to pin 3 of the pulse width modulator controller for short circuit protection and for limiting current flow through the switch.

A start-up current through resistor 56 which builds to a 1 ma level in a series capacitor 70, causes a slow start-up of the pulse width modulator controller 38. Now, short duration pulsating signals from the output (pin 6) start to turn the switch 34 on and off. Inductor 28 stores energy during the on period of switch 34 and transfers this energy to the storage capacitor 24 through diode 36 during the off period of the switch. A few turns of secondary winding 32 now can provide energy to the capacitor 70 through a rectifier diode 72. This energy flowing into the capacitor 70 can supply the additional power necessary to make the pulse width modulator controller function fully. Now, the output voltage sense signal from the resistors 62 and 64 is applied to the feedback terminal, that is, the inverting terminal (pin 2) of the error amplifier 44 to automatically provide the regulation for maintaining a constant output voltage from the boost switching regulator 26 irrespective of input voltage variations.

Figure 3:
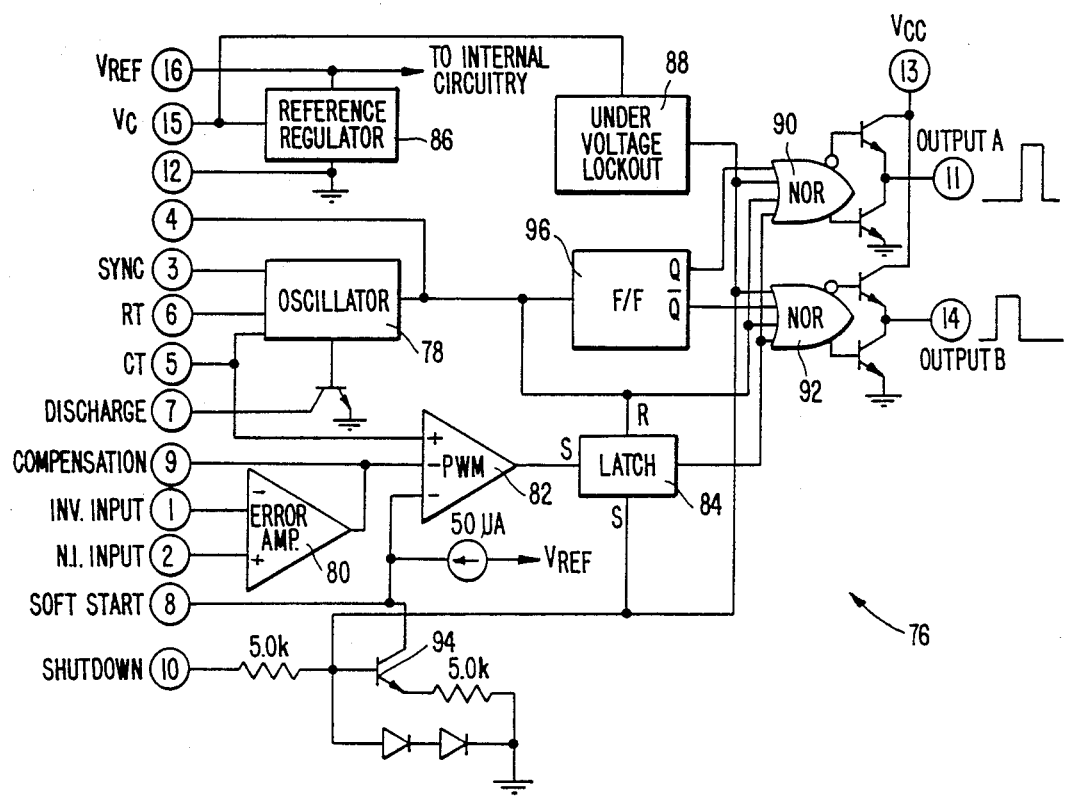
FIG. 3 is a block diagram of an inverter pulse width modulator for the conversion circuit of FIG. 1.

Current transferred from the primary winding-inductor 28 to the secondary winding 32 of transformer 30 passes through a diode 74 to charge a capacitor 75 and provide the input power for an inverter pulse width modulator 76. This inverter pulse width modulator provides a pulse signal on two separate outputs, and is a conventional integrated circuit such as the SG 2525 manufactured by Motorola, U.S.A. A block diagram of this inverter pulse width modulator is illustrated in FIG. 3.

The inverter pulse width modulator 76 is basically similar to the pulse width modulator controller 38 with the exception that it is provided with an oscillator controlled flip flop circuit and dual output NOR gates to provide dual pulse outputs. Like the pulse width modulator controller, the inverter pulse width modulator includes a pulse producing oscillator 78, an error amplifier 80, and a pulse width modulator 82 connected to a latch 84. A low voltage power supply is applied to the inverter pin 15 which also connects a reference voltage regulator circuit 86 and an undervoltage lockout circuit 88 which in turn provides an input to two output NOR gates 90 and 92, to the latch 84 and a shutdown transistor 94.

The components of the inverter pulse width modulator 76 operate in substantially the same manner as described in connection with like components in the pulse width modulator controller 38 except that the outputs of the oscillator 78 and the latch 84 are connected to the input of a flip flop circuit 96. The outputs of the latch 84 and the flip flop circuit 96 are connected as inputs to the output NOR gates 90 and 92, and the NOR gate outputs are provided by output transistor pairs 98 and 100 to pins 11 and 14. The pulse outputs on pins 11 and 14 are as illustrated in FIG. 3 and occur sequentially as the flip flop circuit 96 changes state.

Referring back to FIG. 1, the combination of capacitor 98 and resistor 100 determines the frequency of the oscillator 78 for the inverter pulse width modulator, while a resistor divider formed by a resistor 102 and a variable resistor 104 determines the amount of DC voltage applied to the noninverted terminal (pin 2) of the error amplifier 80. This causes the error amplifier to set the magnitude of the duty cycle for the output pulses at pins 11 and 14. These output pulses drive the inverter switches for a resonant inverter 106 which converts the DC signal on line 108 to AC for a load 110.

The resonant inverter 106 includes switches 112 and 114 which are connected to the pins 14 and 11, respectively of the inverter pulse width modulator 76. These switches are suitable solid state or mechanical switches which are driven on and off in response to the pulses at the outputs of the inverter pulse width modulator. Since these pulses occur at different times, the switch 112 will be on when the switch 114 is off and vice verse. During the time that the switch 112 is on or conductive, energy flows from the line 108 through the switch 112 and a resonant inductor 116 to charge a capacitor 118. Then when the switch 112 is off and the switch 114 turns on, stored energy from the capacitor 118 flows back through the resonant inductor and the switch 114. If the pulse repetition frequency which operates the switches is identical with the resonance frequency of the LC network formed by the resonant inductor 116 and capacitor 118, then the inverter 106 operates effectively as a resonant inverter.

During normal operation, when power is first received at the rectifier input terminals 14 and 16, the thermistor 22 offers sufficiently high resistance to limit the inrush current to the storage capacitor 24. However, when power is first received, it is important to insure that the pulse width modulator controller 38 starts operation only after the storage capacitor 24 becomes charged to nearly the input voltage peak. Otherwise, switch 34 might be driven on while current is still flowing to the filter capacitor through the inductor 28. Depending on the amount of current flow, the inductor 28 may be fully or partially saturated, and in this condition, if the switch 34 is turned on, the inductor may offer only partial or no inductance. As a result, switch 34 will experience a virtual short circuit and possible resultant damage.

The required delay in the operation of the switch 34 until the capacitor 24 has charged is provided by the resistor 56, the capacitor 70 and the undervoltage lockout unit 46. The undervoltage lockout unit will prevent operation of the pulse width modulator controller 38 until the input voltage exceeds the undervoltage lockout value. The time that the voltage across the capacitor 70 exceeds the undervoltage lockout value depends upon the values of resistor 56 and capacitor 70. These can be set to insure that the specified input voltage level is not reached until storage capacitor 24 is given time to charge.

As soon as the pulse width modulator controller 38 starts working, switch 34 will start to turn on and off. Inductor 28 will periodically store and release energy and secondary winding 32 will start to supply additional energy to capacitor 70 through diode 72 and energy to capacitor 75 through diode 74. The capacitors 70 and 75 now supply the necessary operating power to the pulse width modulator controller and the inverter pulse width modulator respectively, and it should be noted that the inventer pulse width modulator 86 is not powered until the secondary winding 32 provides power to charge the capacitor 75.

When the conversion circuit 10 experiences a short term power interruption, power may be reestablished while the resistance of the thermistor 22 is still low. In this situation, the amount of inrush current drawn by the storage capacitor 24 depends on the amount of charge retained by this capacitor at the end of the power interruption. If the retained charge is low, a large inrush current will occur.

To control the inrush current to a minimal, nondamaging level, the charge on the storage capacitor 24 is maintained during a short term power interruption by removing the load 110 as soon as the power interruption occurs. If this is done, the storage capacitor will retain its full potential with the only power drain therefrom being caused by the resistors 62 and 64. However, the resistor divider formed by these resistors has a very high impedance, and the energy drawn thereby is extremely small.

The load 110 is disconnected from the storage capacitor 24 by the removal of power from the inverter pulse width modulator 76. This removes the output signals from pins 11 and 14, and the switches 112 and 114 will remain open. During a power interruption, the secondary winding 32 cannot supply energy to the capacitor 75, and the storage capacity of this capacitor is very small so that the inverter pulse width modulator 76 will almost instantly shut down. Rapid shutdown can be insured by having the undervoltage lockout 88 operate at a lockout voltage close to the voltage storage capacity of the capacitor 75. As soon as the voltage across the capacitor 75 drops below this lockout voltage, the undervoltage lockout 88 shuts down the inverter pulse width modulator.

Figure 4:
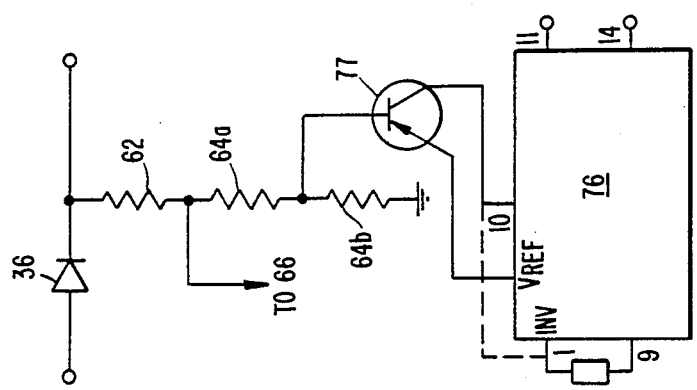
FIG. 4 is a circuit diagram of a second embodiment of the storage capacitor voltage sense circuit of FIG. 1.

Another way to remove the load 40 from the storage capacitor 24 is illustrated in FIG. 4. Basically, this is accomplished by sensing the voltage across the storage capacitor and then applying the sense signal to either the shutdown terminal (pin 10) or the inverted terminal (pin 1) of the inverter pulse width modulator 76. For this purpose, the output voltage sense resistor divider, which is formed by the resistors 62 and 64 in FIG. 1, is rearranged to include three resistors 62a, 62b, and 64. The combined resistance of the resistors 62a and 62b, equals the resistance of the resistor 62 of FIG. 1.

A PNP transistor 77 is connected between the shutdown terminal 10 and the terminal 16 of the inverter pulse width modulator 76 as shown in solid lines in FIG. 4. Terminal 16 provides a voltage reference source which, for purposes of illustration, may provide a 5.1 volt reference. The collector of transistor 77 may be alternatively connected to the inverted terminal pin 1 of the inverter pulse width modulator 76 rather than to the shutdown terminal 10, as shown in broken lines in FIG. 4.

Regardless of whether the collector of transistor 77 is connected to the pin 1 or the pin 10, when the voltage between the base of the transistor and ground falls below the reference voltage (5.1 v) minus one diode drop (approximately 5.1 v−0.6 v=4.5 v), then transistor 77 turns on and the collector applies the 4.5 v to either the shutdown terminal 10 or to the inverted terminal 1. This voltage upon either of these terminals is enough to cause immediate shutdown terminating the outputs on pins 11 and 14. By choosing the proper resistance values for the resistors 62, 64a and 64b, the output from the inverter pulse width modulator 76 can be shutdown as soon as the voltage across the storage capacitor 24 drops to a set level. For example, if during normal operation the voltage across the storage capacitor is maintained at 250 volts, in the case of a power interruption, the inverter pulse width modulator can be shutdown as soon as the voltage across the storage capacitor drops to a 220 volt level. Similarly, after power is resumed, the inverter pulse width modulator will be activated as soon as the voltage across the storage capacitor exceeds the 220 volt level.

It is important to note that the objectives of this invention can also be achieved with integrated circuits other than the pulse width modulators 38 and 76 if they provide the required functions. For example, one can design an integrated circuit that incorporates all the functions of the two pulse width modulators into one chip. Further, one can also design this new integrated circuit to provide the option(s) by which the inverter drive signal can be removed simply by sensing voltage across the storage capacitor 24 or by sensing the power interruption in other convenient locations of the circuit. For example, the sense signal can be fed back to a comparator which then disables the inverter drive signal before the voltage across the filter capacitor drops below an acceptable level.

Inrush current protection under all circumstances, enhances the reliability of a power inverter. In many applications, power inverters are required to maintain a constant voltage to a fixed output load. The voltage variations across the output load are mainly due to the input AC line voltage variations and change in the load. These AC line voltage variations cause the rectified DC voltage across the storage capacitor 24 to vary. Also, changes in the load cause an uneven energy draw from the capacitor. Since this invention utilizes a boost switching regulator 26 to maintain a constant DC across capacitor 24, and also to supply the required amount of energy for this storage capacitor, a power inverter can always provide a constant voltage to its load and thereby eliminates the need for a separate and complicated feedback network. A good quality and high storage capability capacitor 24, and a precision resistor divider voltage feedback network 62 and 64 will ensure a smooth and constant DC across capacitor 24.

Figure 5:
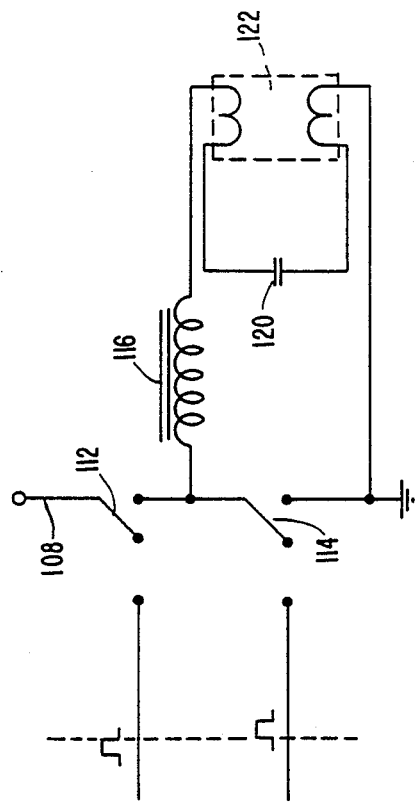
FIG. 5 is a circuit diagram of a resonant inverter for use with the conversion circuit of FIG. 1 to drive a fluorescent lamp ballast.

Utilizing the present invention, a very efficient and reliable electronic ballast for a fluorescent lamp has been designed as shown in FIG. 5. This ballast utilizes a resonant inverter concept similar to that of FIG. 1. In FIG. 5, a capacitor 126 is a blocking capacitor which blocks DC in the resonant network and in a lamp 122. The dimming of the light intensity can be accomplished by varying the resistor 104, because, this changes the DC voltage reference at the noninverted terminal (pin 2) of the inverter pulse width modulator 76. This change, in turn, varies the duty cycle of the output signal (pin 11 and pin 14) that drives switches 112 and 114. The amount of on time vs. off time of the inverter switches 112 and 114 determines the light output from the lamp 122.

Usually, it is very difficult to design a ballast which maintains a constant light output from a fluorescent lamp which is independent of input AC voltage variations. However, in the case of the circuit of FIG. 5, simply because of a constant voltage across storage capacitor 24, no separate feedback loop is necessary to maintain a constant light output. Additionally, the constant and smooth DC across the filter capacitor also helps to remove any flickering of the light.

Figure 6:
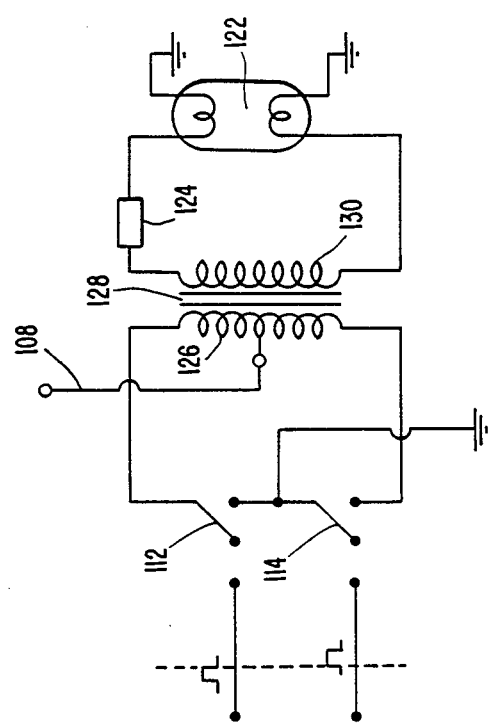
FIG. 6 is a circuit diagram of a push-pull inverter for use with the conversion circuit of FIG. 1 to drive a fluorescent lamp ballast.

Using this invention, a fluorescent lamp ballast which offers inrush current protection and maintains constant light output can also be designed by utilizing an inverter other than a resonant inverter. For example, an electronic ballast can be designed using a half-bridge, a full-bridge, a flyback or a push-pull inverter. Descriptions of these types of inverters are readily available. As a further illustration, an electronic ballast that utilizes this invention and a push-pull inverter is shown in FIG. 6. Here, an impedance limiting element, for example, a resistor, an inductor or a capacitor 124 is used to limit current into the lamp 22 once the lamp is ignited.

The direct current signal on the line 108 is provided to the center tap of a primary winding 126 for a transformer 128 having a secondary winding 130 connected across the lamp 122. The transformer can be a step up or step down transformer which provides an alternating current to the lamp 122 under the control of the switches 112 and 114.

Figure 7:
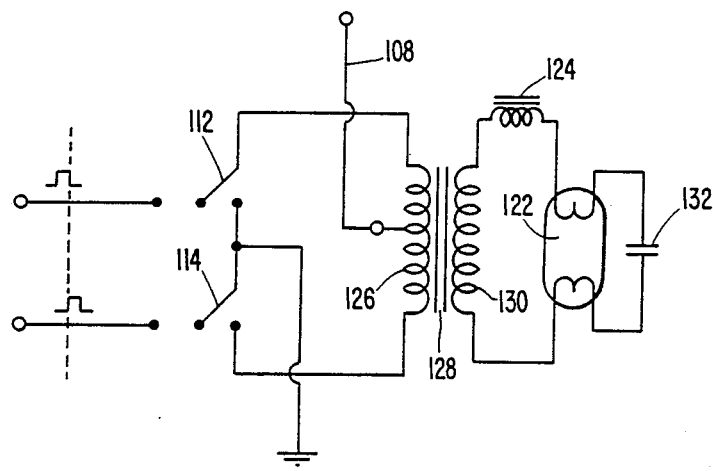
FIG. 7 is a circuit diagram of a second embodiment of a push-pull inverter for use with the conversion circuit of FIG. 1 to drive a fluorescent lamp ballast.

In FIG. 7, a fluorescent lamp ballast is shown which also uses a push-pull inverter of the type shown in FIG. 6. Here, however, the impedance limiting element 124 is an inductor, and a capacitor 132 is provided across the lamp 122. The values of the inductive impedance limiting element 124, the capacitor 132, and the frequency of the inverter may be chosen so as to provide a resonant circuit.

Figure 8:
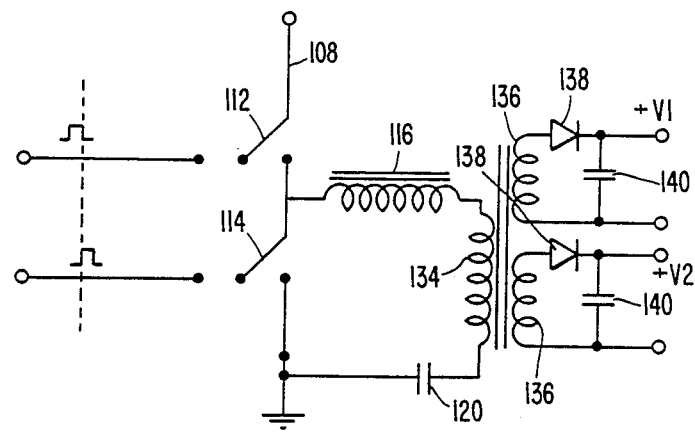
FIG. 8 is a circuit diagram of a resonant inverter for use with the conversion circuit of FIG. 1 to provide a plurality of isolated DC power supplies.
Figure 9:
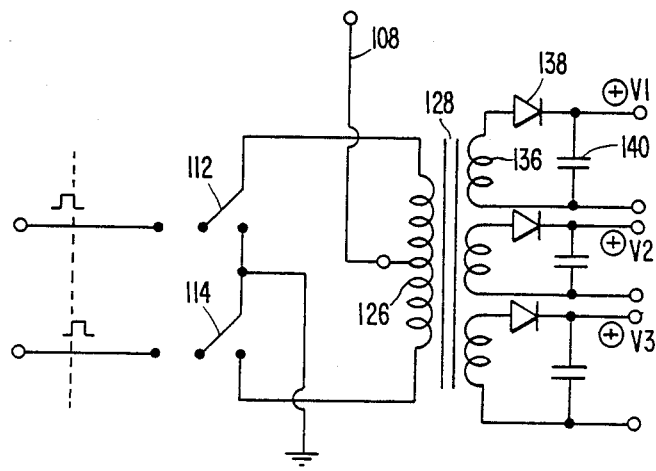
FIG. 9 is a circuit diagram of a push-pull inverter for use with the conversion circuit of FIG. 1 to provide a plurality of isolated DC power supplies.
Figure 6:
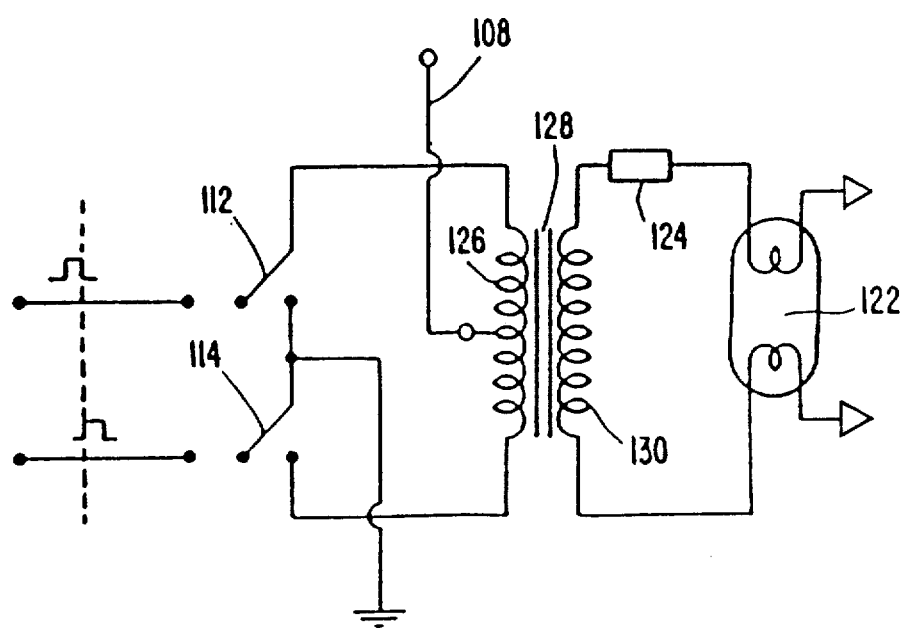

An inverter power supply from the conversion circuit 1 of the present invention can be used effectively to drive loads other than a fluorescent lamp as illustrated in FIGS. 8 and 9. Here, the output from the inverter provides isolated, multiple DC power supplies. In FIG. 8, the resonant inverter of FIG. 3 provides an AC output across a transformer 134. This transformer has two identical secondary circuits consisting of a secondary winding 136, a rectifier 138 in series with the secondary winding and a filter capacitor 140 shunting the secondary winding at the output of the rectifier. The rectifier 138 rectifies the AC signal from the secondary winding 136, and this rectified signal is filtered by the capacitor 140 and provided as a DC signal at the outputs V1 and V2.

FIG. 9 shows a similar DC power supply using the push-pull inverter of FIG. 6. Here, three identical isolated DC power supplies are provided having outputs V1, V2 and V3. Due to a constant potential across the filter capacitor 24 in FIG. 1, the isolated DC outputs of FIGS. 8 and 9 maintain constant potentials which are independent of AC line variations at rectifier inputs 14 and 16.

Industrial Applicability

The conversion circuit 10 operates effectively to convert a power line AC input to a regulated DC potential which may then be converted back to an AC signal by a switching inverter. Simultaneously, the conversion circuit provides inrush current protection under all circumstances, and may effectively be employed to provide a constant output voltage to a fixed load regardless of variations in the power line AC input.

We claim:

1. A conversion unit for converting an alternating current signal from a power source and providing a converted signal to a load while operating to limit inrush current from the power source under all conditions comprising rectifier means connected to receive the alternating current signal from said power source and to convert said alternating current signal to a pulsating direct current signal, storage capacitor means connected to said rectifier means to receive said pulsating direct current signal and to charge in response thereto, said storage capacitor means operating to provide a filtered output direct current signal, and boost switching regulator means connected between said rectifier means and said storage capacitor means, said boost switching regulator means including inductor means connected to receive the pulsating direct current signal from said rectifier means and to raise said pulsating direct current signal to provide an inductor output signal of a higher potential, switch means connected to said inductor means, said switch means operating in a first state to cause the inductor means to store a potential and in a second state to permit said inductor output signal to charge said storage capacitor means, drive means operative in response to said pulsating direct current signal to drive said switch means repetitively between said first and second states, and an inverter means connected between said storage capacitor means and said load, said inverter means operating to change said filtered output direct current signal to an alternating current signal wherein said inverter means includes inverter switching means connected to receive the filtered output direct current signal from said storage capacitor means, and inverter switching control means operative in response to said pulsating direct current signal to drive said switching means, said inverter switching control means operating upon the discontinuance of said pulsating direct current signal to cause said inverter switching means to open and disconnect said load from the storage capacitor means.

2. The conversion unit of claim 1 which includes negative temperature coefficient thermistor means connected in series between said rectifier and inductor means.

3. The conversion unit of claim 1, wherein said inductor means forms the primary winding of a transformer means, said transformer means having secondary winding means connected to provide power to said drive means in response to the pulsating direct current signal from said rectifier means.

4. The conversion unit of claim 1, wherein power circuit means is provided to provide power to said drive means in response to the pulsating direct current signal from said rectifier means, said power circuit means including delay means to delay the provision of power to said drive means until said storage capacitor means has charged.

5. The conversion unit of claim 4, wherein said inductor means forms the primary winding of a transformer means, said transformer means having secondary winding means connected to provide power to said power circuit means in response to the pulsating direct current signal provided to said inductor means.

6. The conversion unit of claim 4 which includes negative temperature coefficient thermistor means connected in series between said rectifier and inductor means, said power circuit means being connected between said negative temperature coefficient thermistor means and said inductor means to receive the pulsating direct current signal from said thermistor means.

7. The conversion unit of claim 1 which includes negative temperature coefficient thermistor means connected in series between said rectifier and inductor means.

8. The conversion unit of claim 7, wherein said inductor means forms the primary winding of a transformer means having secondary winding means connected to provide power to said inverter switching control means in response to the pulsating direct current signal from said rectifier and thermistor means.

9. The conversion unit of claim 8, wherein said secondary winding means is connected to provide power to said drive means.

10. The conversion unit of claim 9, wherein power circuit means is provided to provide power from said thermistor means to said drive means, said power circuit means including delay means to delay the provision of power to said drive means until said storage capacitor means has charged.

11. The conversion unit of claim 1, wherein said load includes fluorescent lamp means having lamp ballast means connected thereto, said lamp ballast means including an inverter means connected between said storage capacitor means and said fluorescent lamp means, said inverter means operating to change said filtered output direct current signal to an alternating current signal.

12. A conversion unit for converting an alternating current signal from a power source and providing a converted signal to a load while operating to limit inrush current from the power source under all conditions comprising rectifier means connected to receive the alternating current signal from said power source and to convert said alternating current signal to a pulsating direct current signal, storage capacitor means connected to said rectifier means to receive said pulsating direct current signal and to charge in response thereto, said storage capacitor means operating to provide a filtered and regulated output direct current signal and inverter means connected to said load and to receive said filtered output direct current signal from said storage capacitor means and operative to convert said filtered output direct current signal to an alternating current signal for said load, said inverter means including switching means for selectively making and breaking a circuit to said storage capacitor means, and switch control means operative in response to said pulsating direct current signal to control said switching means, said switch control means operating upon the loss of said pulsating direct current signal to cause said switching means to break the circuit to said storage capacitor means to disconnect the load from said storage capacitor means.

13. The conversion unit of claim 12 which includes a boost switching regulator means connected between said rectifier means and storage capacitor means to receive the pulsating direct current signal and to raise said pulsating direct current signal to provide a regulator output signal of a higher potential to said storage capacitor means.

14. The conversion unit of claim 13 which includes negative temperature coefficient resistance means connected in series between said rectifier and boost switching regulator means.

15. The conversion unit of claim 13, wherein said boost switching regulator means includes inductor means connected to receive the pulsating direct current signal, said inductor means forming the primary winding of a transformer means, said transformer means having secondary winding means connected to provide power to said switch control means in response to the pulsating direct current signal.

16. The conversion unit of claim 15, wherein said boost switching regulator means operates to provide a regulated DC potential across said storage capacitor means which is substantially independent of variations in the alternating current signal from said power source.

* * * * *

UNITED STATES PATENT AND TRADEMARK OFFICE
CERTIFICATE OF CORRECTION

PATENT NO. : 4,864,482

DATED : September 5, 1989

INVENTOR(S) : Fazle S. QUAZI et al.

It is certified that error appears in the above-identified patent and that said Letters Patent is hereby corrected as shown below:

On the title page, item [75]

Correct the spelling of the first-named inventor's first name from "Fazie" to --Fazle--.

In Figure 6, change the two ground symbols on the right side of the Figure to arrow symbols.

Signed and Sealed this

Twenty-second Day of October, 1991

Attest:

HARRY F. MANBECK, JR.

*Attesting Officer*      *Commissioner of Patents and Trademarks*